US006641123B2

(12) United States Patent
Takahashi

(10) Patent No.: US 6,641,123 B2
(45) **Date of Patent: *Nov. 4, 2003**

(54) CLAMP APPARATUS

(75) Inventor: Kazuyoshi Takahashi, Tokyo (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/867,573

(22) Filed: May 31, 2001

(65) Prior Publication Data

US 2001/0050455 A1 Dec. 13, 2001

(30) Foreign Application Priority Data

May 31, 2000 (JP) ....................................... 2000-162896

(51) Int. Cl.$^{7}$ .................................................. B23Q 3/08

(52) U.S. Cl. ......................... 269/32; 269/222; 269/233; 269/277

(58) Field of Search .......................... 269/32, 222, 277, 269/233, 24, 27, 216, 217, 220, 221, 225.6, 228, 93, 94, 238; 76/55, 25, 105, 106

(56) References Cited

U.S. PATENT DOCUMENTS

| | | | | |
|---|---|---|---|---|
| 4,458,889 A | | 7/1984 | McPherson et al. | 269/32 |
| 4,637,597 A | * | 1/1987 | McPherson | 269/32 |
| 4,679,782 A | * | 7/1987 | Horn | 269/228 |
| 5,975,605 A | * | 11/1999 | Kot | 294/115 |
| 6,338,476 B1 | * | 1/2002 | Takahashi | 269/32 |

FOREIGN PATENT DOCUMENTS

DE 298 20 284 U1 2/1999

* cited by examiner

*Primary Examiner*—Joseph J. Hail, III
*Assistant Examiner*—Daniel Shanley
(74) *Attorney, Agent, or Firm*—Paul A. Guss

(57) ABSTRACT

A clamp apparatus comprises a toggle link mechanism which converts rectilinear motion of a rod member into rotary motion, an arm which is rotatable by a predetermined angle in accordance with a driving action of a cylinder section, and a lock mechanism which holds an unclamping state of the arm even when transmission of driving force of the cylinder section to the arm is cut off.

6 Claims, 9 Drawing Sheets

CLAMP APPARATUS

BACKGROUND OF THE INVENTION

1. Field of the Invention

The present invention relates to a clamp apparatus capable of clamping a workpiece by the aid of an arm which is rotatable by a predetermined angle in accordance with a driving action of a driving mechanism.

2. Description of the Related Art

Conventionally, for example, when a constitutive part of an automobile or the like is welded, a clamp cylinder has been used in order to clamp the constitutive part. Such a clamp cylinder is disclosed, for example, in U.S. Pat. No. 4,458,889.

As shown in FIGS. 8 and 9, in the clamp cylinder disclosed in U.S. Pat. No. 4,458,889, a piston rod 2, which is movable back and forth in accordance with a driving action of a cylinder 1*c*, is arranged between a pair of divided bodies 1*a*, 1*b*. A coupling 3 is connected to a first end of the piston rod 2. A pair of links 5*a*, 5*b* and a pair of rollers 6*a*, 6*b* are rotatably installed to both sides of the coupling 3 respectively by the aid of a first shaft 4. An arm 8, which is rotatable by a predetermined angle, is connected between the pair of links 5*a*, 5*b* by the aid of a second shaft 7.

In this case, the pair of rollers 6*a*, 6*b* are provided slidably by the aid of a plurality of needles 9*a* which are installed to holes. The piston rod 2 is provided displaceably integrally with the rollers 6*a*, 6*b* in accordance with a guiding action of the rollers 6*a*, 6*b* which are slidable along track grooves 9*b* formed on the bodies 1*a*, 1*b* respectively.

However, in the case of the clamp cylinder disclosed in U.S. Pat. No. 4,458,889 concerning the conventional technique described above, for example, when the arm 8 is in an unclamping state in which an unillustrated workpiece is not held and when the supply of the pressure fluid to the cylinder 1*c* is cut off due to any cause, then the arm 8 is in a free state, because the transmission of the driving force to the arm disappears. It is feared that the arm 8 may be spontaneously rotated, for example, due to the force of inertia of the arm 8 or the operation of a robot or the like to which the clamp cylinder is installed.

In view of the above, it is conceived that the unclamping state of the arm 8 is held by means of the frictional force based on the sliding resistance of a piston which is slidable along a cylinder chamber, or the unclamping state of the arm 8 is held by increasing the frictional force by means of the sliding resistance of a link mechanism. However, the following inconvenience arises. That is, the frictional resistance is changed by the abrasion of the sliding portion due to the use of the clamp cylinder for a long period of time. It is impossible to reliably maintain the unclamping state of the arm 8.

SUMMARY OF THE INVENTION

A general object of the present invention is to provide a clamp apparatus which makes it possible to reliably hold an arm in an unclamping state even when transmission of driving force to the arm is cut off.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
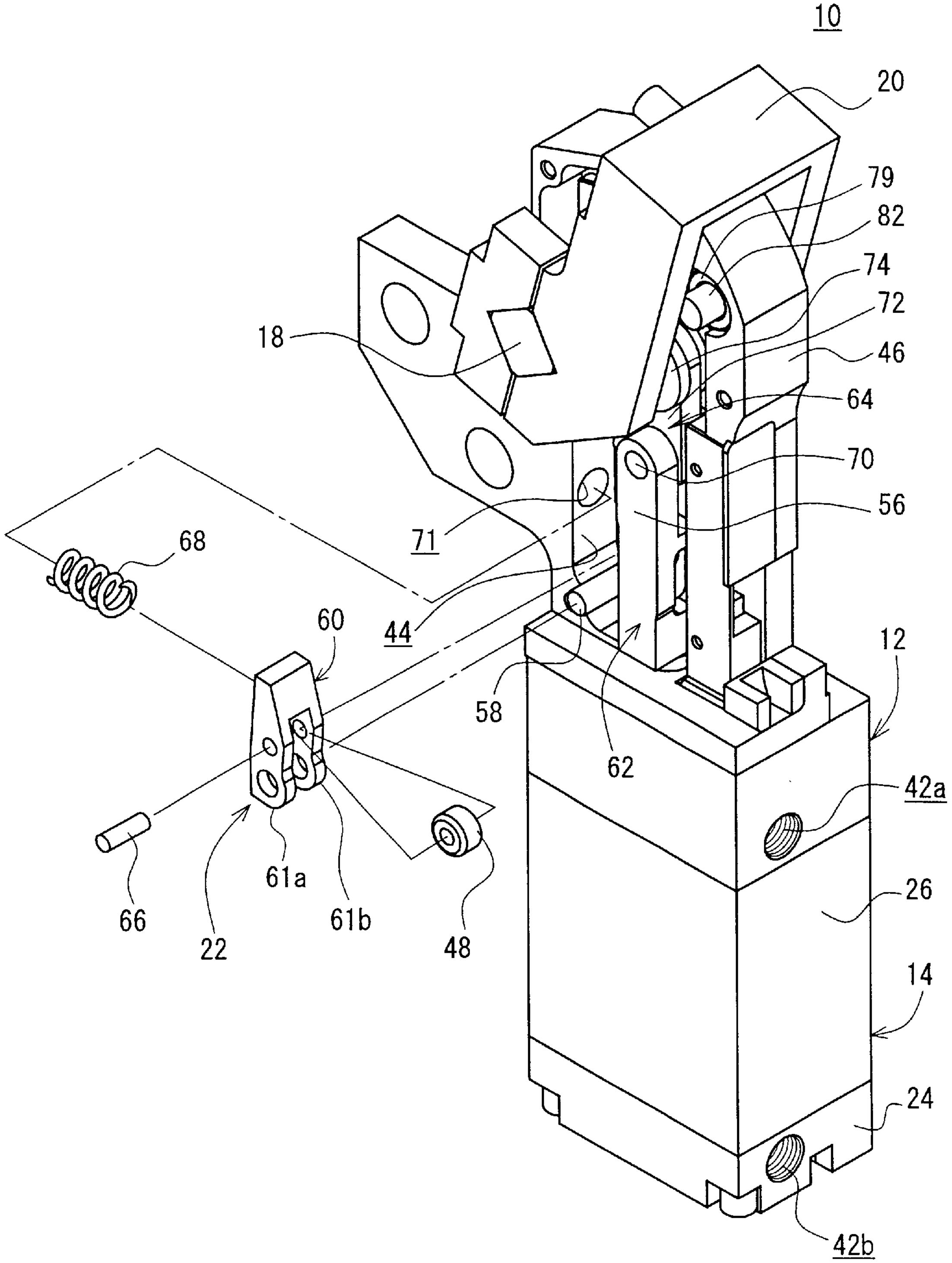
FIG. 1 shows an exploded perspective view illustrating major parts of a clamp apparatus according to an embodiment of the present invention.
Figure 2:
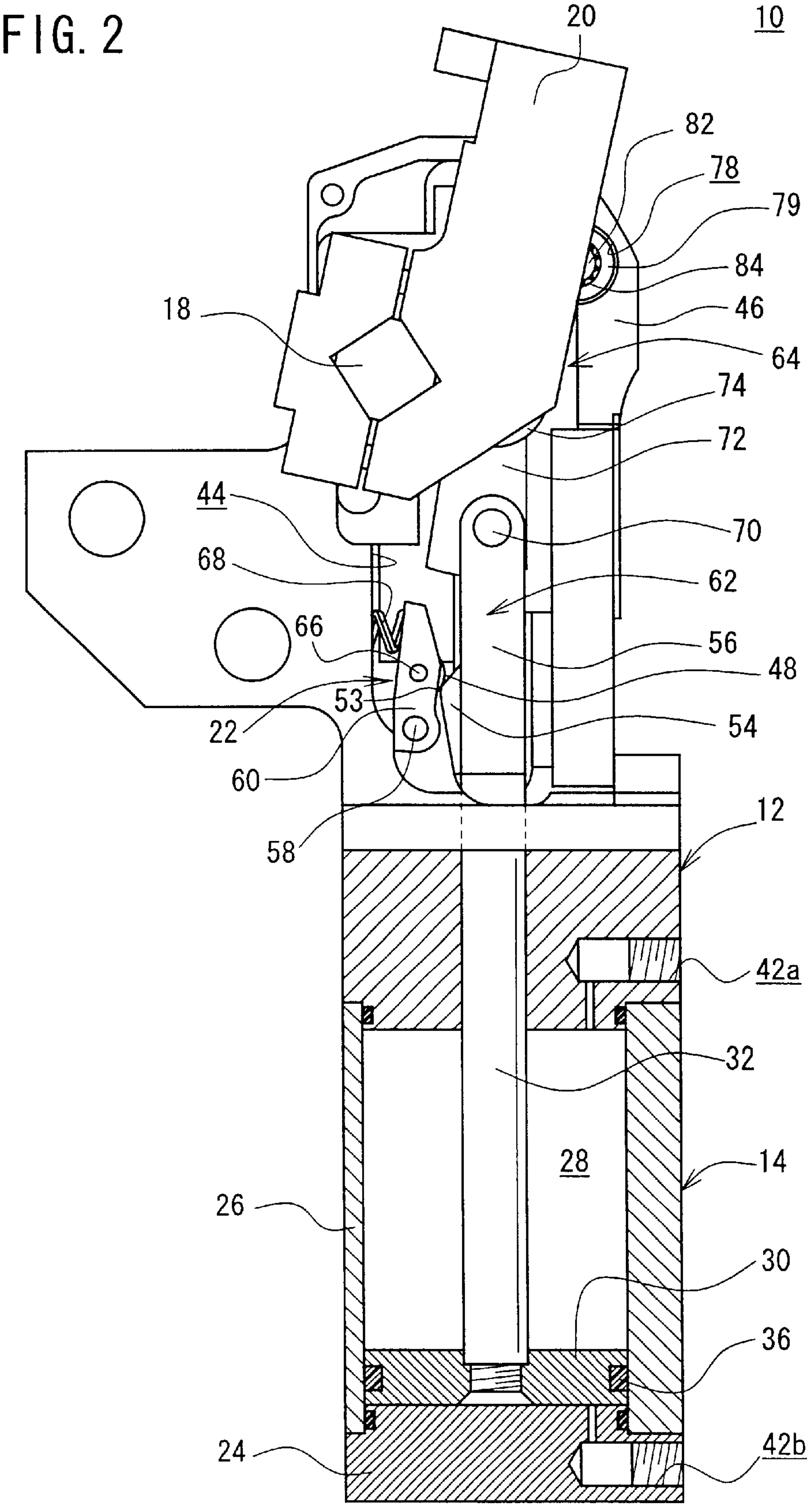
FIG. 2 shows a partial vertical sectional view taken along an axial direction of the clamp apparatus according to the embodiment of the present invention.

In FIGS. 1 and 2, reference numeral 10 indicates a clamp apparatus according to an embodiment of the present invention.

The clamp apparatus 10 comprises a body 12, a cylinder section (driving mechanism) 14 which is connected to a lower end of the body 12 in an air-tight manner, an arm 20 which is connected to a bearing section 18 having a rectangular cross section protruding to the outside through a pair of substantially circular openings (not shown) formed through the body 12, and a lock mechanism 22 which is provided at the inside of the body 12 and which holds the arm 20 at the initial position in the unclamping state.

The cylinder section 14 includes an end block 24, and an angular barrel-shaped cylinder tube 26 which has its first end connected to a recess of the end block 24 in an air-tight manner and its second end connected to the body 12 in an air-tight manner.

As shown in FIG. 2, the cylinder section 14 further includes a piston 30 which is accommodated in the cylinder tube 26 and which is movable reciprocatively along the cylinder chamber 28, and a rod member 32 which is connected to a central portion of the piston 30 and which is displaceable integrally with the piston 30. A cross section of the piston 30, which is substantially perpendicular to the axis of the rod member 32, is formed to have a substantially elliptic configuration. The cross-sectional configuration of the cylinder chamber 28 is also formed to be a substantially elliptic configuration corresponding to the piston 30.

A piston packing 36 is installed to the outer circumferential surface of the piston 30.

Unillustrated attachment holes are bored through four corner portions of the end block 24. The end block 24, the cylinder tube 26, and the body 12 are assembled in an air-tight manner respectively by the aid of four shafts (not shown) inserted into the attachment holes. A pair of pressure fluid inlet/outlet ports 42*a*, 42*b* for introducing/discharging the pressure fluid (for example, compressed air) with respect to the cylinder chamber 28 are formed on the body 12 and the end block 24.

The body 12 is constructed by integrally assembling a first casing 46 and an unillustrated second casing. A chamber 44 is formed in the body 12 by recesses formed on the first casing 46 and the unillustrated second casing respectively. A free end of the rod member 32 faces to the interior of the chamber 44.

A toggle link mechanism 64 for converting the rectilinear motion of the rod member 32 into the rotary motion of the arm 20 by the aid of a knuckle joint 62 is provided at a first end of the rod member 32. The knuckle joint 62 comprises a knuckle block 56 having a forked section with branches which are separated from each other by a predetermined spacing distance and which are branched substantially in parallel to one another, and a knuckle pin 70 which is rotatably installed to holes formed through the branches. An engaging section 54, which has a first inclined surface 50 and a second inclined surface 52 to be engaged with a roller member 48 as described later on, is formed on a first side surface of the knuckle block 56 (see FIG. 3).

Figure 4:
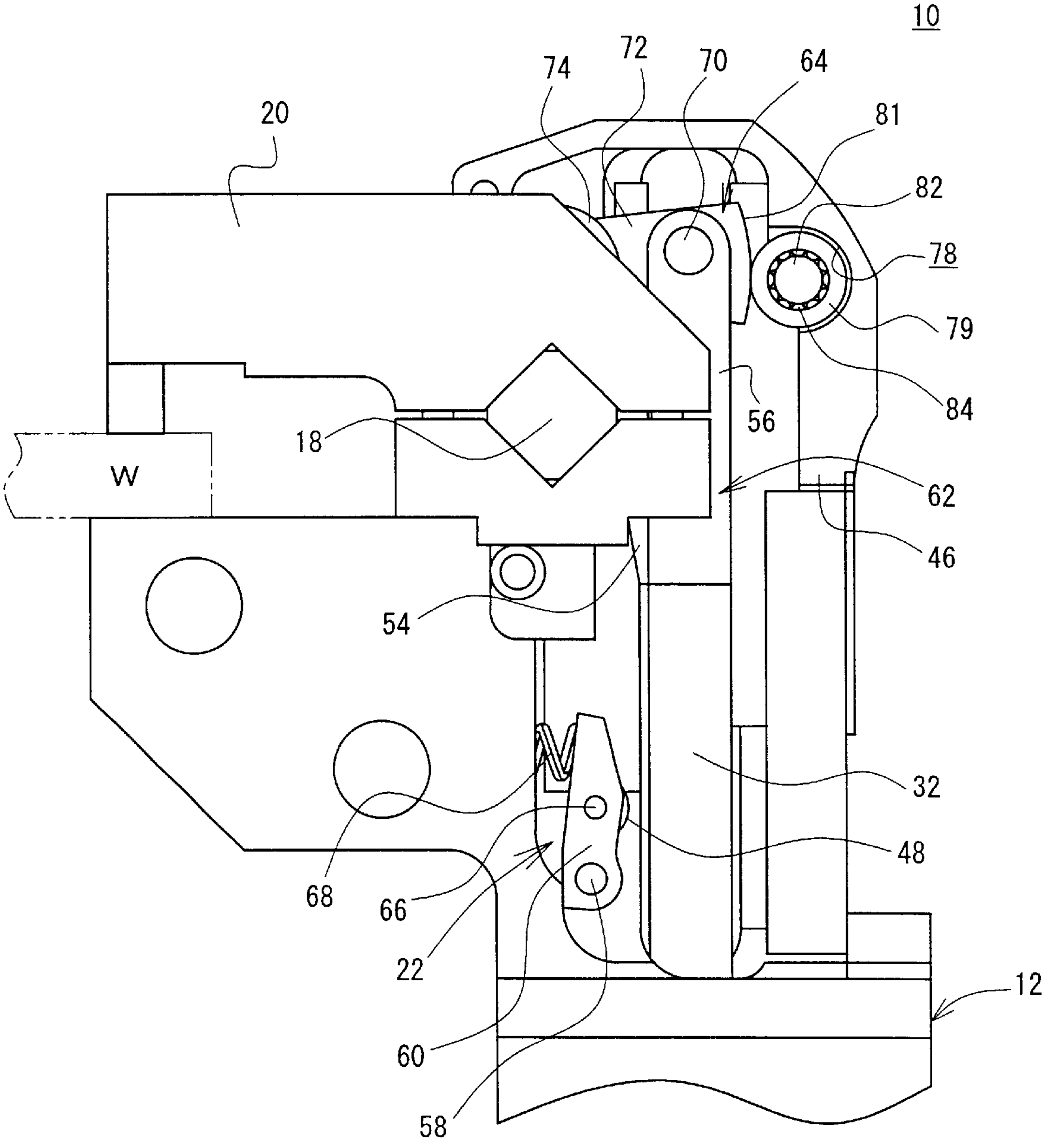
FIG. 4 shows, with partial omission, a side view illustrating a state in which an arm is rotated starting from an initial position shown in FIG. 1, and a workpiece is clamped.

The toggle link mechanism 64 includes a link plate (link member) 72 which is connected between the branches of the forked section of the knuckle joint 62 by the aid of a knuckle pin 70, and a support lever 74 which is rotatably supported by a pair of substantially circular openings formed through the first casing 46 and the unillustrated second casing (see FIG. 4).

The link plate 72 is interposed between the knuckle joint 62 and the support lever 74, and it functions to link the knuckle joint 62 and the support lever 74.

That is, the link plate 72 has a first hole (not shown) which is formed on a first end side, and a second hole (not shown) which is formed on a second end side. The link plate 72 is connected to the free end of the rod member 32 by the aid of the knuckle joint 62 and the knuckle pin 70 engaged with the first hole. The link plate 72 is connected to the forked section of the support lever 74 by the aid of an unillustrated link pin rotatably installed to the second hole. A curved surface 81, which makes contact with a guide roller 79 as described later on, is formed at a first end of the link plate 72 (see FIGS. 4 and 5).

The support lever 74 has a forked section with branches which are formed with holes for rotatably installing an unillustrated link pin thereto, and the bearing section 18 having a rectangular cross section which is formed to protrude in a direction (direction substantially perpendicular to the plane of the paper) substantially perpendicular to the axis of the rod member 32 and which is exposed to the outside from the body 12 through unillustrated openings. The arm 20 for clamping an unillustrated workpiece is detachably installed to the bearing section 18. Therefore, the support lever 74 is provided to make rotary motion integrally with the arm 20.

Figure 3:
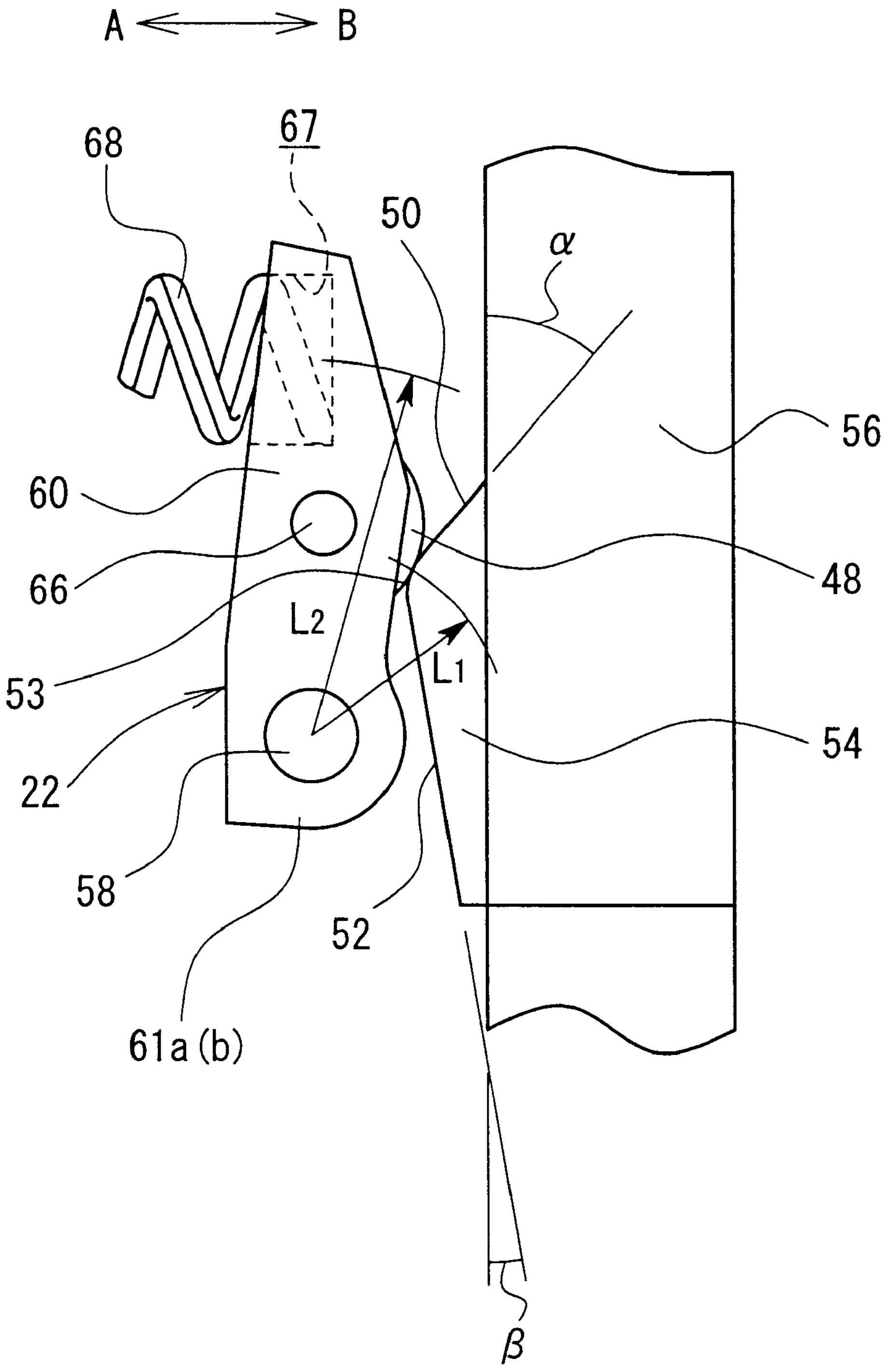
FIG. 3 shows a partial magnified view illustrating a lock mechanism shown in FIG. 2.

As shown in FIGS. 1 and 3, the lock mechanism 22 includes a support point pin 58 which is arranged in the chamber 44 and which is supported by the first casing 46 and the unillustrated second casing, a lock plate 60 which is provided rotatably by a predetermined angle about the support point of the support point pin 58 rotatably installed to the first end side, a roller member 48 which is supported rotatably between branched tabs 61*a*, 61*b* of the lock plate 60 by the aid of the pin member 66, an engaging section 54 which is provided on the knuckle block 56 described above and which has the first inclined surface 50, the second inclined surface 52, and a ridge section 53 formed at a boundary portion between the first inclined surface 50 and the second inclined surface 52 so that the roller member 48 is engageable therewith, and a spring member 68 which has its first end fastened by a recess 67 formed on the end side of the lock plate 60 disposed on the side opposite to the support point pin 58.

A second end of the spring member 68 is fastened to a recess 71 which is formed on the inner wall surface of the first casing 46. The spring member 68 is provided so that the lock plate 60 is always pressed in the direction of the arrow B about the support point of the support point pin 58 in accordance with the resilient force thereof. In other words, the lock plate 60 is provided rotatably by a predetermined angle in the direction of the arrow A about the support point of the support point pin 58 in accordance with the action of the pressing force exerted on the roller member 48 to overcome the resilient force of the spring member 68.

As shown in FIG. 3, the angle of inclination a of the first inclined surface 50 and the angle of inclination $\beta$ of the second inclined surface 52 with respect to the vertical plane are set respectively so that $\alpha>\beta$ is satisfied. In this case, it is preferable that the angle of inclination a is about 30 degrees to 45 degrees and the angle of inclination $\beta$ is about 10 degrees to 20 degrees.

It is assumed that, on the basis of the central point of the support point pin 58, $L_1$ represents the spacing distance between the support point pin 58 and the abutment point at which the roller member 48 and the engaging section 54 makes the abutment (central point of the pin member 66), and $L_2$ represents the spacing distance between the support point pin 58 and the pressing point at which the spring member 68 makes the pressing action. On this assumption, the holding force of the lock mechanism 22 can be increased by setting the value of $L_2/L_1$ to be large.

As shown in FIG. 4, recesses 78 each having a circular arc-shaped cross section are formed on the upper sides of the inner wall surfaces of the first casing 46 and the unillustrated second casing for constructing the body 12 respectively. A guide roller 79, which is rotatable by a predetermined angle while being in contact with the curved surface 81 of the link plate 72, is provided in the recesses 78. A pin member 82 for rotatably supporting the guide roller 79 is secured to holes which are formed on the first casing 46 and the unillustrated second casing. A plurality of needle bearings 84 are installed in the circumferential direction to a through-hole of the guide roller 79. The guide roller 79 is provided smoothly rotatably in accordance with the rolling action of the needle bearings 84.

The clamp apparatus 10 according to the embodiment of the present invention is basically constructed as described above. Next, its operation, function, and effect will be explained.

At first, the clamp apparatus 10 is fixed at a predetermined position by the aid of an unillustrated fixing means. First ends of pipes such as unillustrated tubes are connected to the pair of pressure fluid inlet/outlet ports 42*a*, 42*b* respectively. Second ends of the pipes are connected to an unillustrated pressure fluid supply source.

After completing the preparatory operation as described above, the unillustrated pressure fluid supply source is energized to introduce the pressure fluid (for example, compressed air) from the first pressure fluid inlet/outlet port **42*b* into the cylinder chamber 28 disposed on the lower side of the piston 30. The piston 30 is pressed in accordance with the action of the pressure fluid introduced into the cylinder chamber 28, and the piston 30 is moved upwardly along the cylinder chamber 28**.

The rectilinear motion of the piston 30 is transmitted to the toggle link mechanism 64 by the aid of the rod member 32 and the knuckle joint 62, and it is converted into the rotary motion of the arm 20 in accordance with the rotary action of the support lever 74 which constitutes the toggle link mechanism 64.

That is, the force acts to upwardly press the link plate 72 and the knuckle joint 62 engaged with the free end of the rod member 32 in accordance with the rectilinear motion (upward movement) of the piston 30. The pressing force exerted on the link plate 72 rotates the link plate 72 by a predetermined angle about the support point of the knuckle pin 70, and it rotates the support lever 74 in accordance with the linking action of the link plate 72.

Therefore, the arm 20 is rotated by a predetermined angle in the counterclockwise direction about the support point of the bearing section 18 of the support lever 74.

During the process in which the arm 20 is rotated in the counterclockwise direction as described above, the curved surface 81 of the link plate 72 contacts with the guide roller 79. The guide roller 79 is rotated about the center of the pin member 82 while holding the state of contact with the curved surface 81 (see FIG. 4).

When the arm 20 is further rotated to abut against the workpiece W, the rotary action of the arm 20 is stopped. As a result, the clamping state is given, in which the workpiece W is clamped by the arm 20.

After the arm 20 stops the rotary action to give the clamping state, the piston 30 and the rod member 32 are further moved upwardly only slightly. Accordingly, the piston 30 and the rod member 32 are stopped to give the displacement terminal position (see FIG. 4).

Subsequently, when the arm 20 is separated from the workpiece to cancel the clamping state, the pressure fluid is introduced into the cylinder chamber 28 disposed on the upper side of the piston 30 from the second pressure fluid inlet/outlet port **42*a* disposed on the opposite side in accordance with the switching action of an unillustrated directional control valve. The piston 30 is pressed in accordance with the action of the pressure fluid introduced into the cylinder chamber 28. The piston 30 is moved downwardly along the cylinder chamber 28**.

The rectilinear motion of the piston 30 is converted into the rotary motion of the arm 20 by the aid of the toggle link mechanism 64. The arm 20 is rotated in the clockwise direction.

Figure 5:
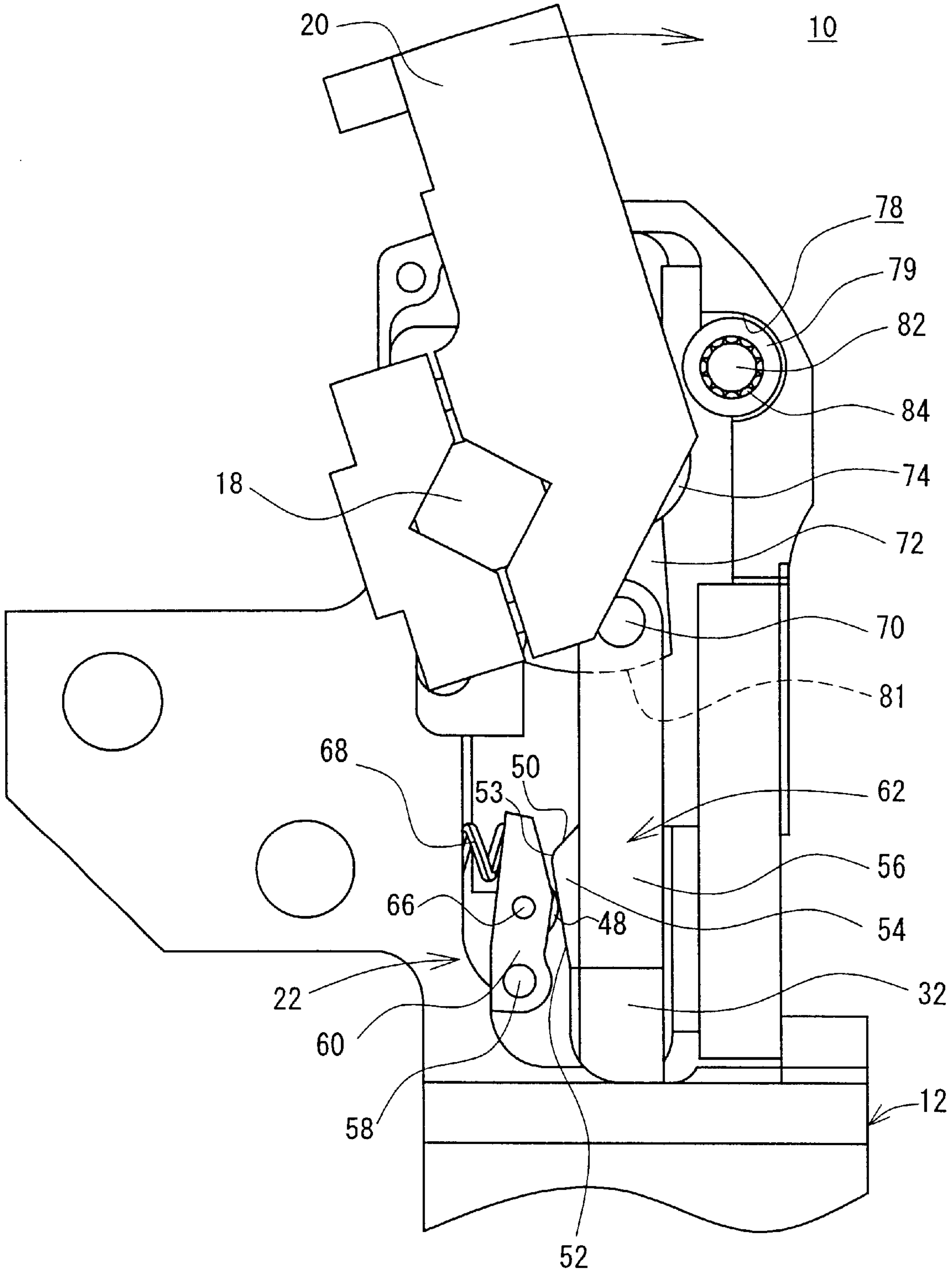
FIG. 5 shows, with partial omission, a side view illustrating a state in which the arm is rotated by a predetermined angle in the clockwise direction starting from the state shown in FIG. 4.

Before the arm 20 is rotated in the clockwise direction to allow the piston 30 to arrive at the lowest limit position, the second inclined surface 52 of the engaging section 54, which is moved downwardly integrally with the knuckle block 56, is engaged with the roller member 48 which is rotatably supported by the lock plate 60 (see FIG. 5).

Figure 6:
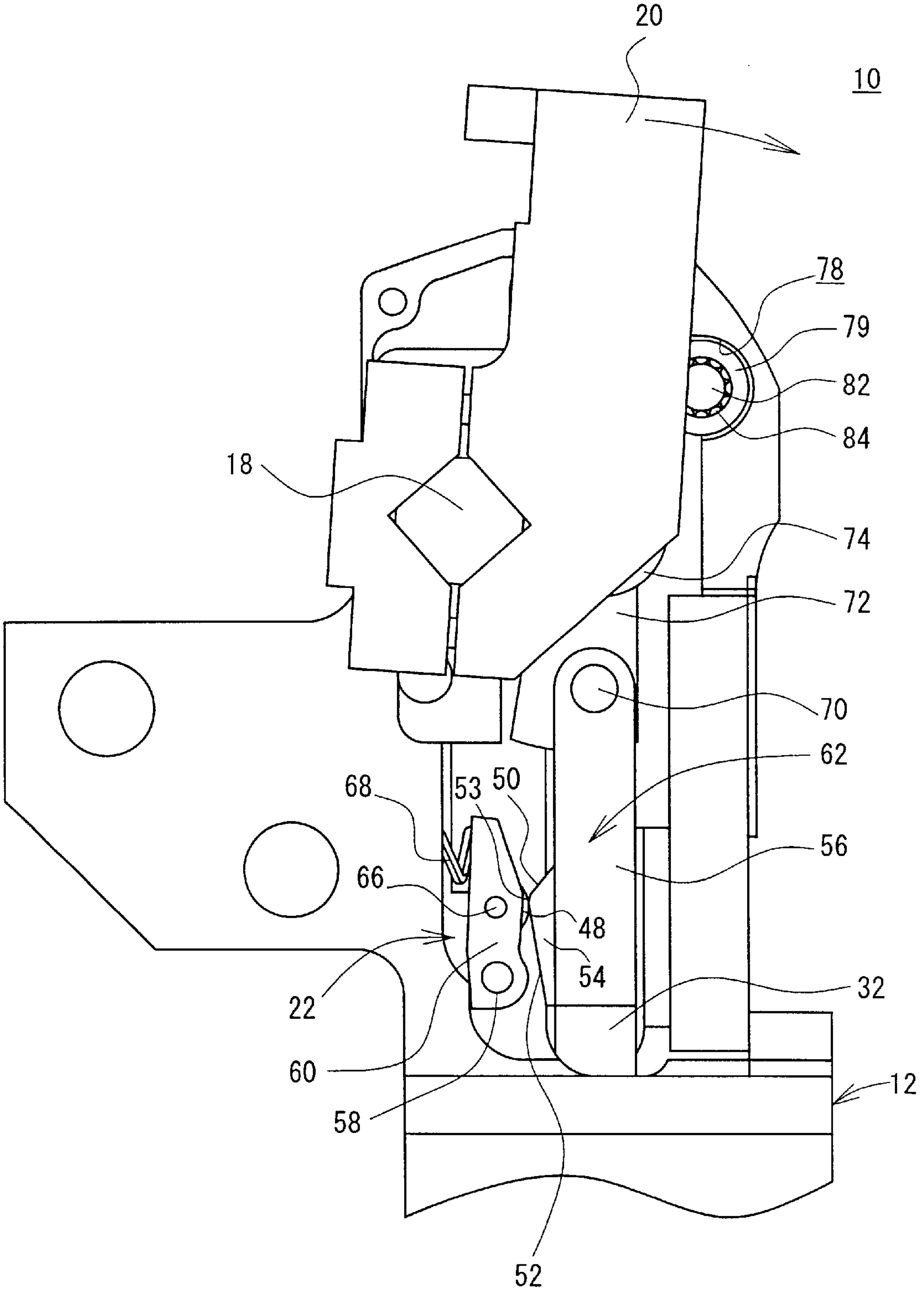
FIG. 6 shows, with partial omission, a side view illustrating a state in which the arm is further rotated by a predetermined angle in the clockwise direction starting from the state shown in FIG. 5.
Figure 7:
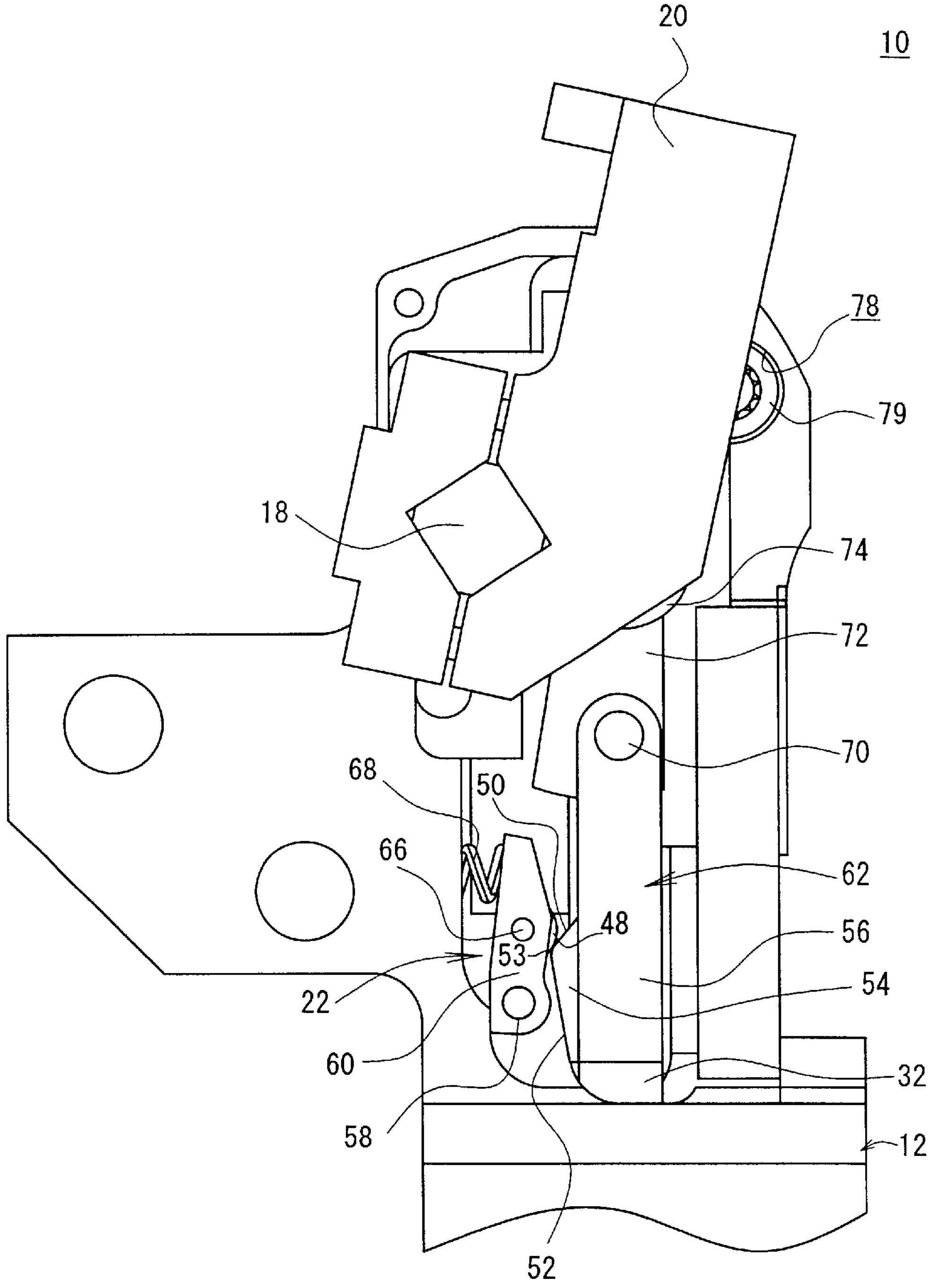
FIG. 7 shows, with partial omission, a side view illustrating a state in which the arm is further rotated by a predetermined angle in the clockwise direction starting from the state shown in FIG. 6, and the arm is held at the initial position in an unclamping state.
Figure 8:
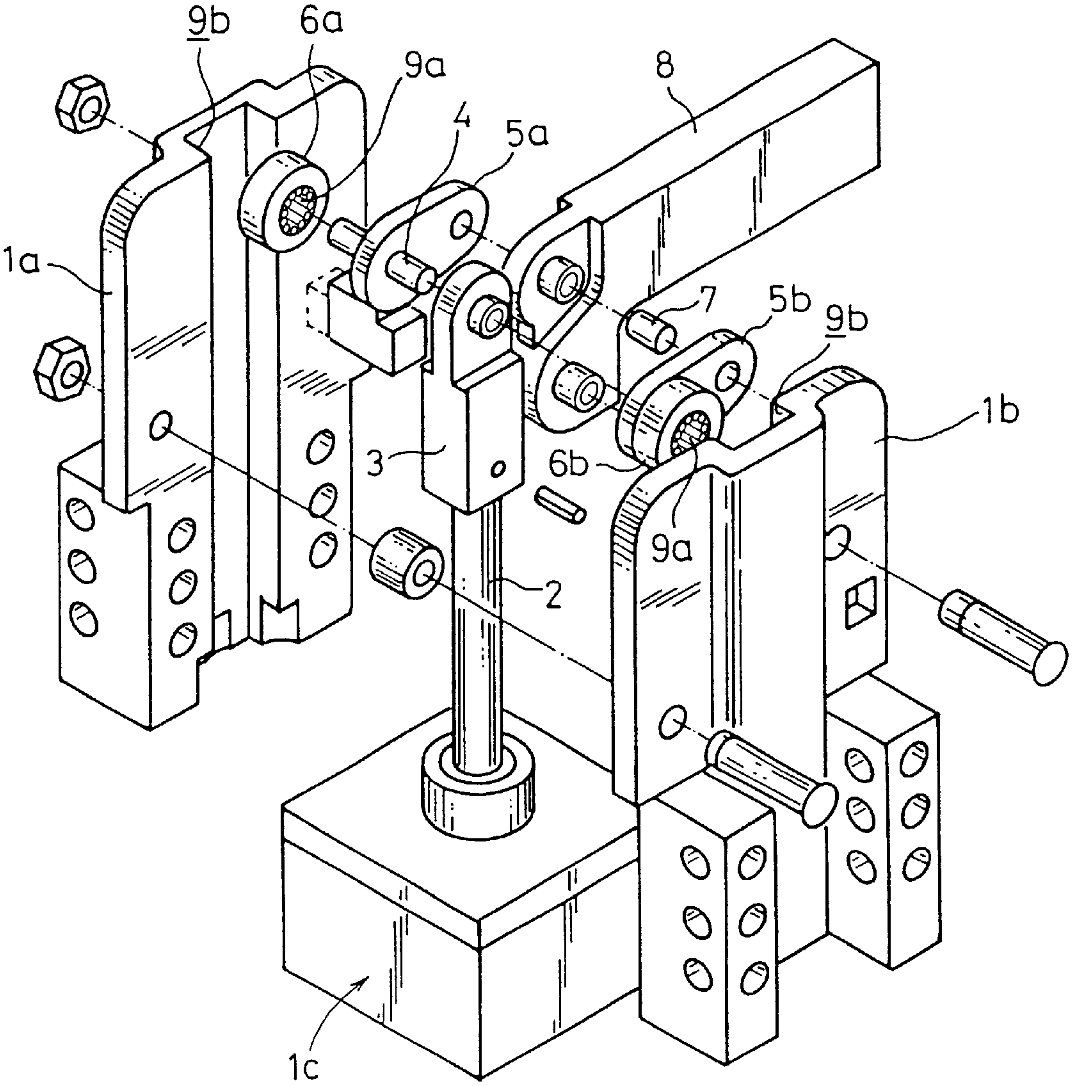
FIG. 8 shows an exploded perspective view illustrating major parts of a clamp cylinder concerning the conventional technique.
Figure 9:
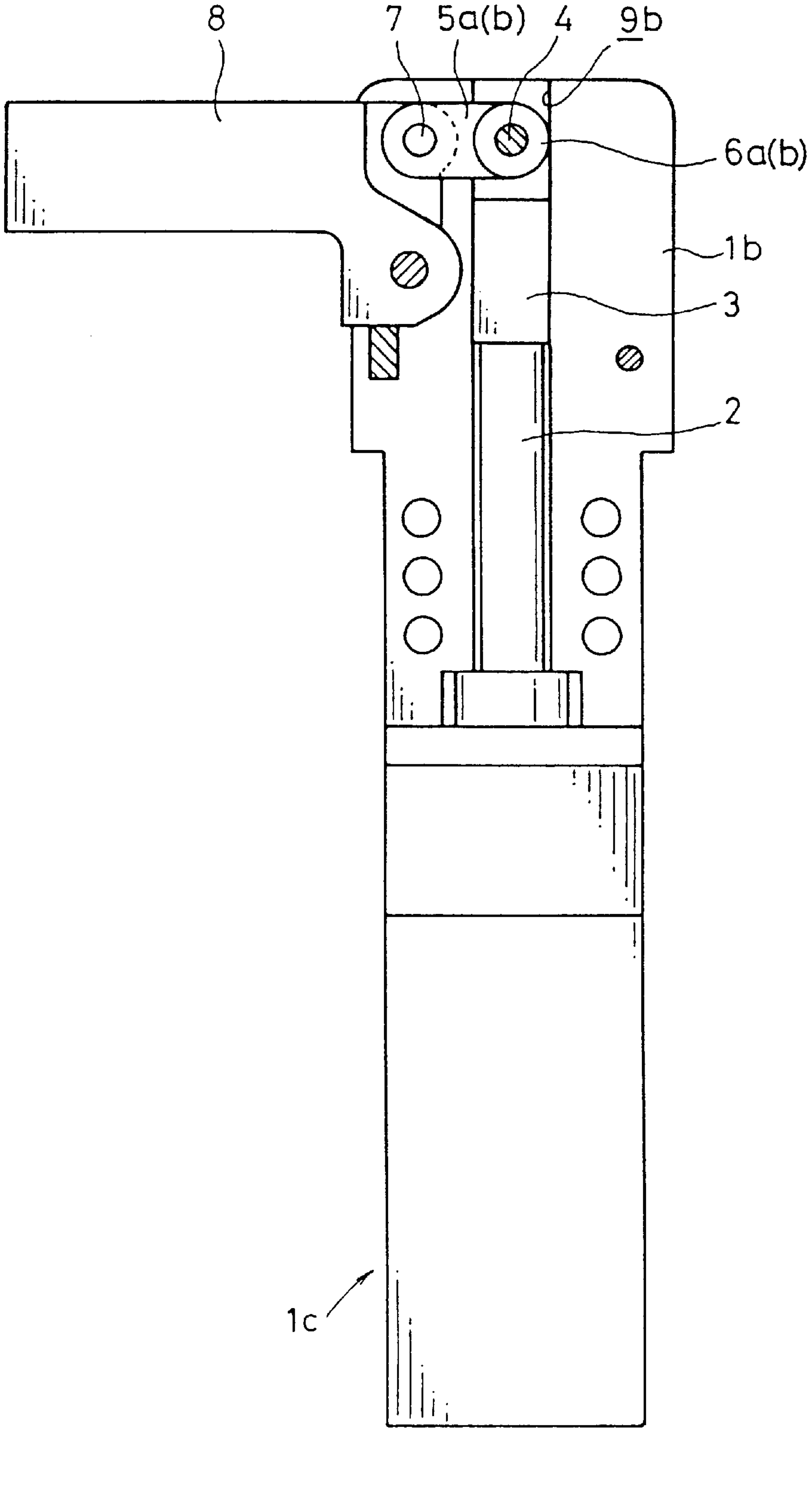
FIG. 9 shows, with partial cross section, a side view illustrating the clamp cylinder shown in FIG. 8.

In this situation, the lock plate 60 is pressed in the direction of the arrow A against the resilient force of the spring member 68. The roller member 48, which is rotatably supported by the lock plate 60, rides over the second inclined surface 52 of the engaging section 54 and the ridge section 53 formed at the boundary portion between the second inclined surface 52 and the first inclined surface 50 respectively (see FIG. 6). The roller member 48 is engaged with the first inclined surface 50. Accordingly, the arm 20 is locked at the initial position in the unclamping state (see FIG. 7).

In this embodiment, the initial position refers to the state in which the piston 30 arrives at the lowest limit position of the cylinder chamber 28 as shown in FIG. 2.

In the locked state described above, the second pressure fluid inlet/outlet port **42*b* is also in the state of being open to the atmospheric air. Therefore, even when the supply of the pressure fluid is stopped by any cause at the initial position in the unclamping state of the arm 20, then the unclamping state is reliably maintained by the lock mechanism 22** without being released.

As described above, in the embodiment of the present invention, owing to the provision of the lock mechanism 22, even when the supply of the pressure fluid to the cylinder section 14 to function as the driving mechanism is stopped, and the transmission of the driving force to the arm 20 is cut off, then the unclamping state of the arm 20 can be reliably maintained.

It is necessary that the force (holding force), with which the arm 20 is held in the unclamping state by the lock mechanism 22, is set to be a proper holding force with which no displacement is caused by the inertial force, for example, even when the robot or the like to which the clamp apparatus 10 is installed is operated. Further, it is necessary that the force (holding force) is set to be a holding force of such a degree that the unclamping holding state can be released by the displacement force of the piston 30 when the pressure fluid is supplied again from the pressure fluid inlet/outlet port **42*b*. In this case, it is preferable that the angle of inclination a of the first inclined surface 50 of the engaging section 54 with respect to the vertical plane is set to be larger than the angle of inclination $\beta$ of the second inclined surface 52. Further, it is preferable that the angle of inclination $\alpha$ of the first inclined surface 50 is set to be about 30 degrees to 45 degrees, and the angle of inclination $\beta$ of the second inclined surface 52** is set to be about 10 degrees to 20 degrees.

In the embodiment of the present invention, the cylinder section 14 is used as the driving mechanism. However, there is no limitation thereto. The rod member 32 may be displaced by using, for example, an unillustrated linear actuator or an electric motor.

What is claimed is:

1. A clamp apparatus comprising:

a body;

a driving mechanism for displacing a rod member provided at the inside of said body in an axial direction of said body;

a toggle link mechanism including a link member connected to said rod member, for converting rectilinear motion of said rod member into rotary motion;

an arm connected to said toggle link mechanism, for making rotation by a predetermined angle in accordance with a driving action of said driving mechanism; and a lock mechanism provided at the inside of said body, for holding said arm in an unclamping state when transmission of driving force of said driving mechanism to said arm is cut off.

2. The clamp apparatus according to claim 1, wherein said lock mechanism includes a support point pin supported by said body, a lock plate provided rotatably by a predetermined angle about a support point of said support point pin, a roller member rotatably supported by said lock plate by the aid of a pin member, an engaging section formed on a knuckle block for constructing said toggle link mechanism, for making engagement with said roller member, and a spring member for pressing said roller member toward said engaging section.

3. The clamp apparatus according to claim 2, wherein said engaging section includes a first inclined surface, a second inclined surface, and a ridge section formed at a boundary portion between said first inclined surface and said second inclined surface with which said roller member is engageable.

4. The clamp apparatus according to claim 3, wherein an angle of inclination $\alpha$ of said first inclined surface with respect to a vertical plane is set to be larger than an angle of inclination $\beta$ of said second inclined surface.

5. The clamp apparatus according to claim 2, wherein holding force of said lock mechanism is set in accordance with $L_2/L_1$ provided that $L_1$ represents a spacing distance between said support point pin and an abutment point at which said roller member and said engaging section makes abutment, and $L_2$ represents a spacing distance between said support point pin and a pressing point at which said spring member makes a pressing action, on the basis of a central point of said support point pin.

6. The clamp apparatus according to claim 1, wherein said driving mechanism is composed of a cylinder section including a piston which is displaceable in accordance with an action of pressure fluid supplied to a cylinder chamber via a pair of pressure fluid inlet/outlet ports.

* * * * *